United States Patent [19]
Barron

[11] 3,810,079
[45] May 7, 1974

[54] PROPAGATION LOSS MEASURING DEVICE
[76] Inventor: Daniel Barron, 150 Kalmia Dr., Greenbelt, Md. 20810
[22] Filed: Sept. 25, 1972
[21] Appl. No.: 292,202

[52] U.S. Cl............................. 340/3 R, 181/.5 AP
[51] Int. Cl............................................ G01s 9/66
[58] Field of Search................... 340/3 R, 3 C, 5 R; 181/.5 AP; 73/67.1, 67.8 R

[56] References Cited
UNITED STATES PATENTS
3,553,636  1/1971  Baird.................................. 340/3 R
3,662,589  5/1972  Adler et al...................... 73/67.8 R

*Primary Examiner*—Richard A. Farley
*Attorney, Agent, or Firm*—R. S. Sciascia; Arthur L. Branning; M. L. Crane

[57] ABSTRACT

This disclosure is directed to a system for determining the propagation loss of a signal passing through water. A signal generator directs a signal through a hydrophone into the water simultaneous with directing a signal into a computer. The return signal is directed into the computer and the pulse energy of the returned signal is compared with the original signal. The difference is a measure of the signal loss.

2 Claims, 1 Drawing Figure

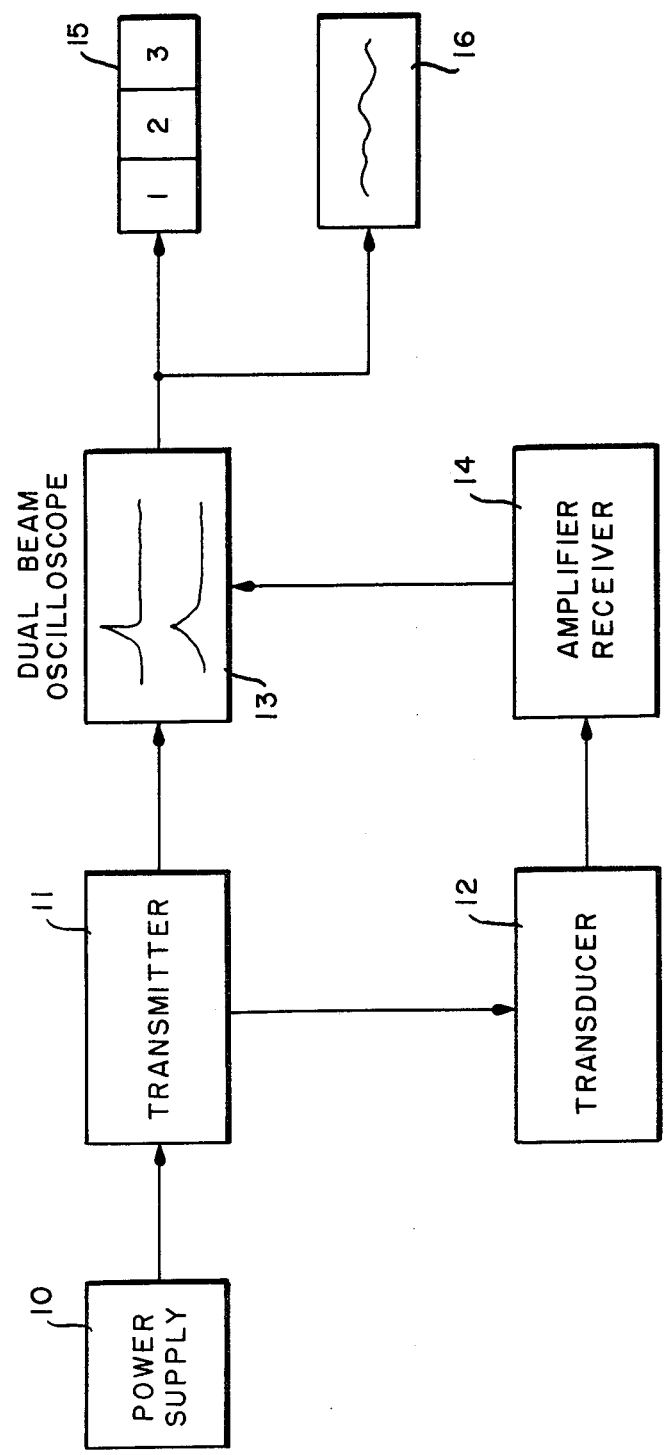

PROPAGATION LOSS MEASURING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to acoustical measuring device and more particularly to a method and system of determining the propagation loss of an acoustic signal in passing through a fluid medium.

Heretofore, instruments or systems have been used for determining distance and/or direction by use of acoustic waves. Various methods have been used to measure propagation loss of these acoustic waves but they are extremely costly methods.

SUMMARY OF THE INVENTION

This invention makes use of a system for transmitting an acoustic signal through a fluid medium for determining distance, direction, or any other desired information in which the signal is returned and determining the propagation loss of the acoustic signal while passing through the medium. The system makes use of a transmitter/receiver for sending and receiving the signal, means for measuring the pulse energy of the transmitted pulse and the received pulse, determining the difference in the two signals and displaying the difference. The display difference is a measure of the propagation loss.

STATEMENT OF THE OBJECTS

It is therefore an object of the present invention to measure the propagation loss of an acoustic signal on passing through a fluid medium.

Another object is to provide a method of differientiing between the acoustical energy of a transmitted signal and the returned, received signal to determine propagation loss between the signals.

Other objects and advantages of this invention will become obvious from the following specification considered with the drawing.

BRIEF DESCRIPTION OF THE DRAWING

The FIGURE illustrates a block diagram of the different components of the system.

DESCRIPTION OF THE SYSTEM

Now referring to the drawing, there is shown by illustration a block diagram of the system for carrying out the invention. The system includes a power source 10 that supplies the necessary power for the different electrically operated elements. A transmitter 11 transmits an electrical signal of a set frequency to a transducer 12 and to one channel of a two beam oscilloscope 13. The oscilloscope displays the input beam signal while the transducer converts the electrical signal to an acoustical signal which is transmitted through the water. The acoustical signal is bounced back and received by the transducer which converts the acoustical signal back to electrical energy. The electrical signal is directed to an amplifier-receiver 14 which amplifies the signal and directs the signal to the second beam of the oscilloscope. The second beam is compared in intensity with the first or original beam to determine any difference in height. The difference is a measure of the propagation loss due to the electrical signal traveling in the water. The two signals are electronically compared (phase and amplitude) and the difference signal is directed to a digital counter 15 which records a difference which is a measure of the propagation loss. The difference in signal may be directed into a recorder 16 which records the difference signal for future references.

The various components are well known in the art. Such transmitter, transducer receiver systems may be found in distance measuring sonar patents and a more specific system has been set forth and described in U.S. Naval Ships publication 92373($a$).

Obviously many modifications and variations of the present invention are possible in the light of the above teachings. It is therefore to be understood that within the scope of the appended claims the invention may be practiced otherwise than as specifically described.

What is claimed is:

1. A method of determining the propagation loss of an acoustical signal transmitted through a fluid medium which comprises:

dividing a transmitted electrical signal into first and second signals each of equal intensity, said first signal directed to a transducer which converts said signal to an acoustical signal which is directed onto an object that reflects the signal back to said transducer which converts the acoustical signal back to an electrical signal, said second signal directed into one beam channel of a two beam oscilloscope, directing the converted acoustical signal into an amplifier receiver, directing the signal from said amplifier-receiver to the second beam channel of said oscilloscope, and comparing the oscilloscope signals of the two beams and determining the propagation loss by the difference in the two oscilloscope beams.

2. A method as claimed in claim 1; wherein, said signals directed into each channel of said two channel oscilloscope are converted into a digital count equal to the difference in the intensity of the two separate signals.

* * * * *